(12) United States Patent
Chaudhuri

(10) Patent No.: US 7,302,273 B2
(45) Date of Patent: Nov. 27, 2007

(54) SYSTEM AND METHOD FOR PROVIDING INTERACTIVE WIRELESS DATA AND VOICE BASED SERVICES

(75) Inventor: Aloke Chaudhuri, Victor, NY (US)

(73) Assignee: Soleo Communications, Inc., Fairport, NY (US)

( * ) Notice: Subject to any disclaimer, the term of this patent is extended or adjusted under 35 U.S.C. 154(b) by 90 days.

(21) Appl. No.: 11/177,631

(22) Filed: Jul. 8, 2005

(65) Prior Publication Data

US 2007/0010266 A1    Jan. 11, 2007

(51) Int. Cl.
*H04Q 7/20* (2006.01)
*H04Q 7/22* (2006.01)
*H04M 11/10* (2006.01)
*H04M 1/00* (2006.01)

(52) U.S. Cl. ................ 455/466; 455/412.1; 455/412.2; 455/413; 455/414.4; 455/556.2

(58) Field of Classification Search .. 455/412.1–412.2, 455/414.1–414.4, 41.2–41.3, 59, 61, 466, 455/563, 515–521, 550.1, 552.1, 553.1, 556.2, 455/557, 560–561, 566–568, 413, 418, 556.1; 709/203, 218–219, 205, 221, 228; 370/395.52; 713/153; 726/12; 379/67.1, 88.18, 88.25, 379/88.26, 88.11–88.13

See application file for complete search history.

(56) References Cited

U.S. PATENT DOCUMENTS

| | | | |
|---|---|---|---|
| 6,404,884 B1 | 6/2002 | Marwell et al. | |
| 6,411,946 B1 | 6/2002 | Chaudhuri | |
| 6,580,904 B2 | 6/2003 | Cox et al. | |
| 6,625,444 B1 | 9/2003 | Fleming, III et al. | |
| 6,668,055 B2 | 12/2003 | Marwell et al. | |
| 6,731,927 B1 | 5/2004 | Stern et al. | |
| 6,792,082 B1 | 9/2004 | Levine | |
| 6,801,763 B2 | 10/2004 | Elsey et al. | |
| 6,816,578 B1* | 11/2004 | Kredo et al. | 379/88.17 |
| 6,816,727 B2 | 11/2004 | Cox et al. | |
| 6,985,961 B1* | 1/2006 | Ramsayer et al. | 709/238 |
| 6,990,189 B2* | 1/2006 | Ljubicich | 379/218.01 |
| 6,990,471 B1* | 1/2006 | Rajaram | 705/64 |
| 6,999,563 B1 | 2/2006 | Thorpe et al. | |
| 7,092,738 B2* | 8/2006 | Creamer et al. | 455/563 |
| 7,127,400 B2* | 10/2006 | Koch | 704/270.1 |
| 2002/0055351 A1 | 5/2002 | Elsey et al. | |
| 2002/0143548 A1 | 10/2002 | Korall et al. | |
| 2003/0032409 A1 | 2/2003 | Hutcheson et al. | |
| 2003/0115288 A1 | 6/2003 | Ljubicich et al. | |
| 2003/0119492 A1 | 6/2003 | Timmins et al. | |

(Continued)

FOREIGN PATENT DOCUMENTS

KR    200202739 A  *  4/2002

*Primary Examiner*—Meless Zewdu
(74) *Attorney, Agent, or Firm*—Majama Muldoon Blasiak & Sullivan LLP

(57) ABSTRACT

A system for providing remote interactive services to users of portable data and voice enabled communications devices, including users of SMS and WAP enabled communications devices. The system interfaces with a user of a communications device in a manner that employs a sequence of different types of interactive sessions over time. An interface with the user is provided that transitions between different types of communication sessions in real time, to appropriately and effectively respond to one or more requests transmitted from the user of the communications device.

29 Claims, 8 Drawing Sheets

U.S. PATENT DOCUMENTS

| | | |
|---|---|---|
| 2003/0130864 A1* | 7/2003 | Ho et al. ................... 705/1 |
| 2003/0211845 A1* | 11/2003 | Lohtia et al. ............ 455/414.3 |
| 2003/0216145 A1 | 11/2003 | Cox et al. |
| 2004/0015380 A1 | 1/2004 | Timmins |
| 2004/0023644 A1 | 2/2004 | Montemer |
| 2004/0029567 A1 | 2/2004 | Timmins et al. |
| 2004/0058710 A1 | 3/2004 | Timmins et al. |
| 2004/0120473 A1* | 6/2004 | Birch et al. ............. 379/88.17 |
| 2004/0132433 A1 | 7/2004 | Stern et al. |
| 2004/0156494 A1 | 8/2004 | Pines et al. |
| 2004/0166832 A1 | 8/2004 | Portman et al. |
| 2004/0198329 A1 | 10/2004 | Vasa |
| 2004/0203834 A1 | 10/2004 | Wang et al. |
| 2004/0220810 A1* | 11/2004 | Leask et al. ............. 704/270.1 |
| 2004/0247092 A1 | 12/2004 | Timmins et al. |
| 2004/0259535 A1 | 12/2004 | Elsey et al. |
| 2005/0002501 A1 | 1/2005 | Elsey et al. |
| 2005/0002508 A1 | 1/2005 | Elsey et al. |
| 2005/0002509 A1 | 1/2005 | Elsey et al. |
| 2005/0002510 A1 | 1/2005 | Elsey et al. |
| 2005/0003837 A1 | 1/2005 | Midkiff et al. |
| 2005/0037744 A1 | 2/2005 | Pines et al. |
| 2005/0038876 A1 | 2/2005 | Chaudhuri |
| 2005/0047560 A1 | 3/2005 | Mostad |
| 2005/0054333 A1 | 3/2005 | Johnson |
| 2005/0070260 A1 | 3/2005 | Mazzara, Jr. |
| 2005/0074112 A1 | 4/2005 | Timmins |
| 2005/0276391 A1 | 12/2005 | Ibbotson et al. |
| 2006/0117019 A1* | 6/2006 | Sylthe et al. ................. 707/10 |

* cited by examiner

SYSTEM AND METHOD FOR PROVIDING INTERACTIVE WIRELESS DATA AND VOICE BASED SERVICES

CROSS-REFERENCE TO APPLICATIONS INCLUDING RELATED SUBJECT MATTER

This patent application includes subject matter that is related to that of U.S. patent application Ser. No. 10/867,231, titled "A Voice XML Network Gateway", filed Jun. 14, 2004 which is incorporated herein by reference in its entirety.

FIELD OF THE INVENTION

This invention relates generally to a system and a method for providing interactive services to users of portable data and voice enabled communications devices, and specifically to providing directory assistance information and other types of services to users of short message service (SMS) data and 802.11 voice enabled devices.

SUMMARY OF THE INVENTION

The system of the invention provides remote interactive services to users of portable data and voice enabled communications devices, including users of short message service (SMS), wireless application protocol (WAP) and multimedia messaging service (MMS) enabled communications devices. The system interfaces with a user of a communications device in a manner that employs a sequence of different types of interactive sessions over time. An interface with the user is provided that transitions between different types of communication sessions in real time, to appropriately and effectively respond to one or more requests transmitted from the user of the communications device.

For example, a user of a communications device may transmit a series of requests to the system using a data communications protocol, such as the SMS protocol, during a first SMS type of session. In response to one or more transmitted requests, the system may transition from the first SMS type of session to a second voice type of session that employs interactive voice communication with the user of the communications device. Upon completion of the second voice type of session, the system may return to a third SMS type of session to further respond to one or more requests that are communicated from the user. In response to one or more requests that are communicated during the third session, the system may transition into a fourth WAP type of session to effectively respond to the one or more requests communicated from the user.

BRIEF DESCRIPTION OF THE DRAWINGS

For a further understanding of the invention, reference will be made to the following detailed description of the invention which is to be read in connection with the accompanying drawings, wherein.

DETAILED DESCRIPTION OF THE INVENTION

Figure 1:
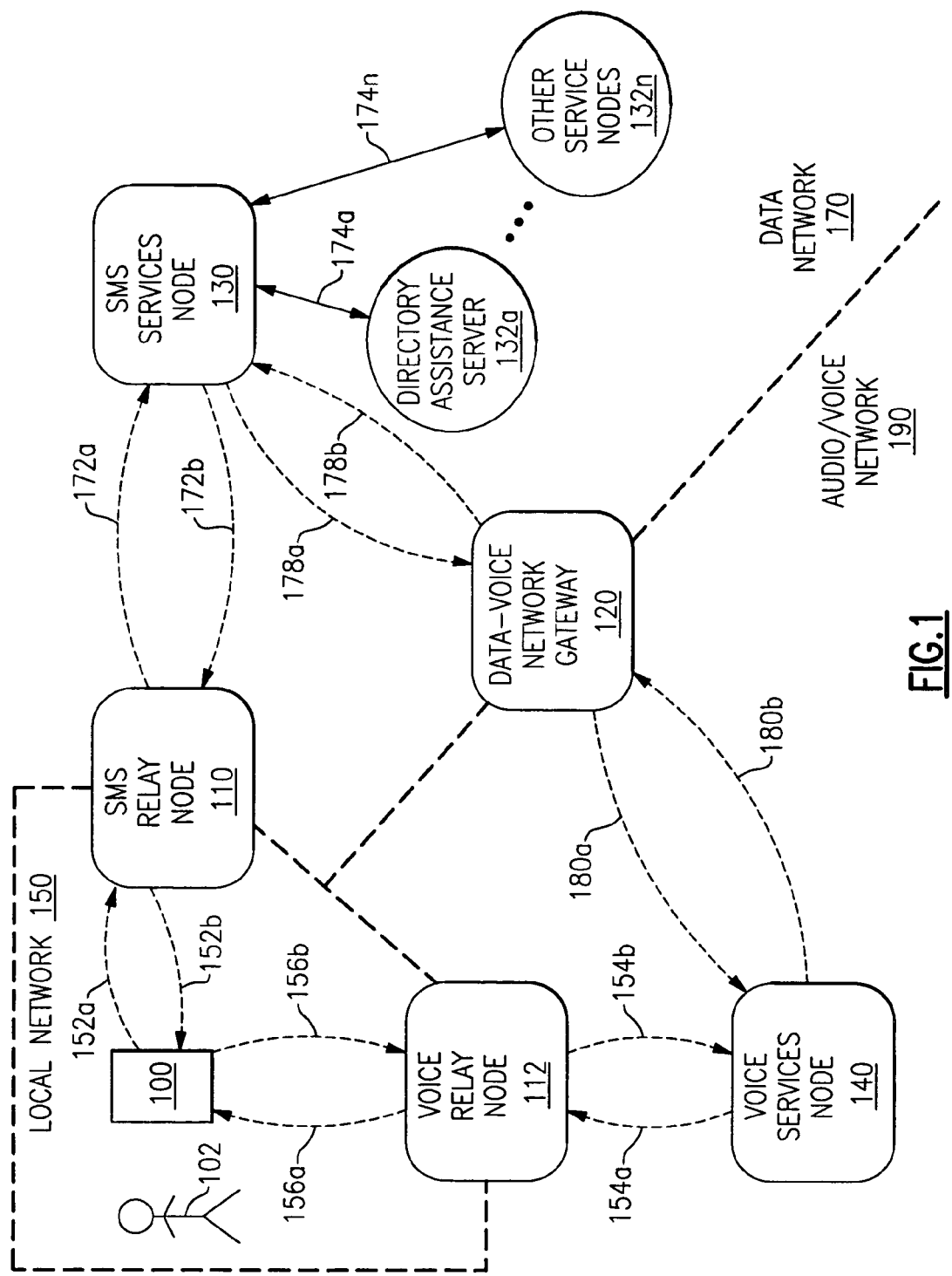
FIG. 1 is a block diagram illustrating an embodiment a system of providing SMS and voice based services to users of SMS and voice enabled communication devices.

FIG. 1 is a block diagram illustrating a system configured to provide services via data and/or voice session interaction with a user of a data and voice enabled communications device 100. The system of the invention inputs multiple types of request communications and outputs multiple types of response communications to a user of a device 100 that is enabled with respect to communication of voice and data.

In one type of embodiment, a user 102 of the device 100 transmits a request that is represented as text data within an SMS protocol communication 152a. The communication 152a is addressed to a SMS services node 130 having a known network protocol address, such as an Internet Protocol (IP) address.

As shown, the device 100 resides within a local wireless communications network 150 that is a public land mobile network (PLMN) 150. The device 100 transmits the SMS communication 152a via a first data communications protocol stack including a wireless communications protocol, such as the Code Division Multiple Access (CDMA) or General Packet Radio Service (GPRS) protocol. The communication 152a is transmitted over the local communications network 150.

An SMS relay node 110 receives the request of the communication 152a via the first protocol stack from local network 150 and re-transmits the request via a second protocol stack including the Internet Protocol (IP) over a data network 170, within a communication 172a to a SMS services node 130 residing within the data network 170.

The SMS services node 130 receives the request of the communication 172a via the second protocol stack from the data network 170 and processes the request. In one scenario, the request is for information, such as for telephone directory assistance information, associated with a name of a person specified within the communication 172a.

In one type of embodiment, the SMS services node 130 accesses information sought by the request from its local data storage (not shown) and transmits an SMS communication 172b to the SMS relay node 110 that is addressed back to the device 100 and that includes the information sought by the request communication 152a. The information sought by the user 102 is encoded as text data within the communication 172b. The SMS relay node 110 transmits a communication 152b that is addressed back to the device 100 and that includes the information encoded as text data.

In another type of embodiment, the SMS services node 130 transmits a communication via communications channels 174a-174n to one or more other service nodes 132a-132n, such as a directory assistance server 132a. Optionally, the directory assistance server 132a may communicate with other service nodes 132b-132n to obtain information sought by the user 102 via the request communication 152a.

The directory assistance server 132a accesses the information sought by the request from its local data storage or from another server 132b-132n and transmits a communication via the communications channel 174a to the SMS services node 130 that includes the information sought by the user 102. The SMS services node 130 transmits a communication 172b including the information back to the SMS relay node 110 and the SMS relay node 110 transmits a communication 152b including the information back to the communications device 100 as previously described.

The aforementioned types of embodiments involve providing directory assistance services via an SMS type of data/protocol session interaction with a user 102 of the communications device 100. These types of embodiments are further described in association with FIGS. 6 and 7. In other embodiments, other types of data/protocol sessions can be employed for providing services to the user 102.

In a variation of the previously described embodiments, the processing of the request 152a can also include the establishment of an audio/voice type of session with the user 102. An audio/voice type of session interaction with the user 102 can include such as a voice dialog between the user 102 and a human operator or between the user 102 and an interactive voice response system.

In this type of embodiment, to initiate a voice session with the user 102 of the communications device 100, the SMS services node 130 transmits a communication 178a to a data-voice network gateway 120. The data-voice network gateway 120 initiates an audio/voice session with the user 102 by transmitting a communication 180a to voice services node 140 in order to contact the user 102 via the communications device 100.

The voice services node 140 transmits a communication 154a to a voice relay node 112 and the voice relay node 112 transmits a communication 156a to the device 100. The communications 180a, 154a and 156a establish a "call" to the device 100 and initiate a voice session with the user 102 of the device 100.

A telephone number associated with the device 100 is used to address the device 100 within the voice network 190 and is included within the communication 178a. Typically, the telephone number can be accessed via automated number identification (ANI) information residing within the communication 152a and relayed to the SMS services node 130 via communication 172a.

In some embodiments, the capabilities of the device 100, such as whether the device 100 is voice and/or MMS enabled, can be determined by accessing information describing the capabilities of the device 100 stored within a communications device (hand set) database (not shown). In some embodiments, the device database is accessed via a network server that is accessible over a wide area network, such as the Internet. In some embodiments, the database resides within the facilities of the wireless telephone carrier.

In some embodiments, the voice network 190 is implemented as a circuit switched voice network and the communications 180a and 154a are transmitted over a circuit switched voice network 190. (See FIG. 2A) In other embodiments, the voice network 190 is implemented as a voice over IP (VoIP) network and the communications 180a and 154a are constructed from VoIP packets and are transmitted over a VoIP packet switching type of network, and not circuit switched (See FIG. 2B). Regardless of the design of the voice network 190, the communication 156a is transmitted over a wireless network 150 provided by a wireless telephone carrier.

In one type of embodiment, a live operator 142a-142n (FIG. 2A) is provided with information within the communication 180a describing a status of and events occurring within the prior SMS session involving the SMS services node 130. In one variation of this embodiment, this information is displayed on a computer display 144a-144n (FIG. 2A) and/or "whispered" via a recorded voice audio communication via an audio speaker (not shown) located proximate to each of the computer displays 144a-144n.

Figure 3:
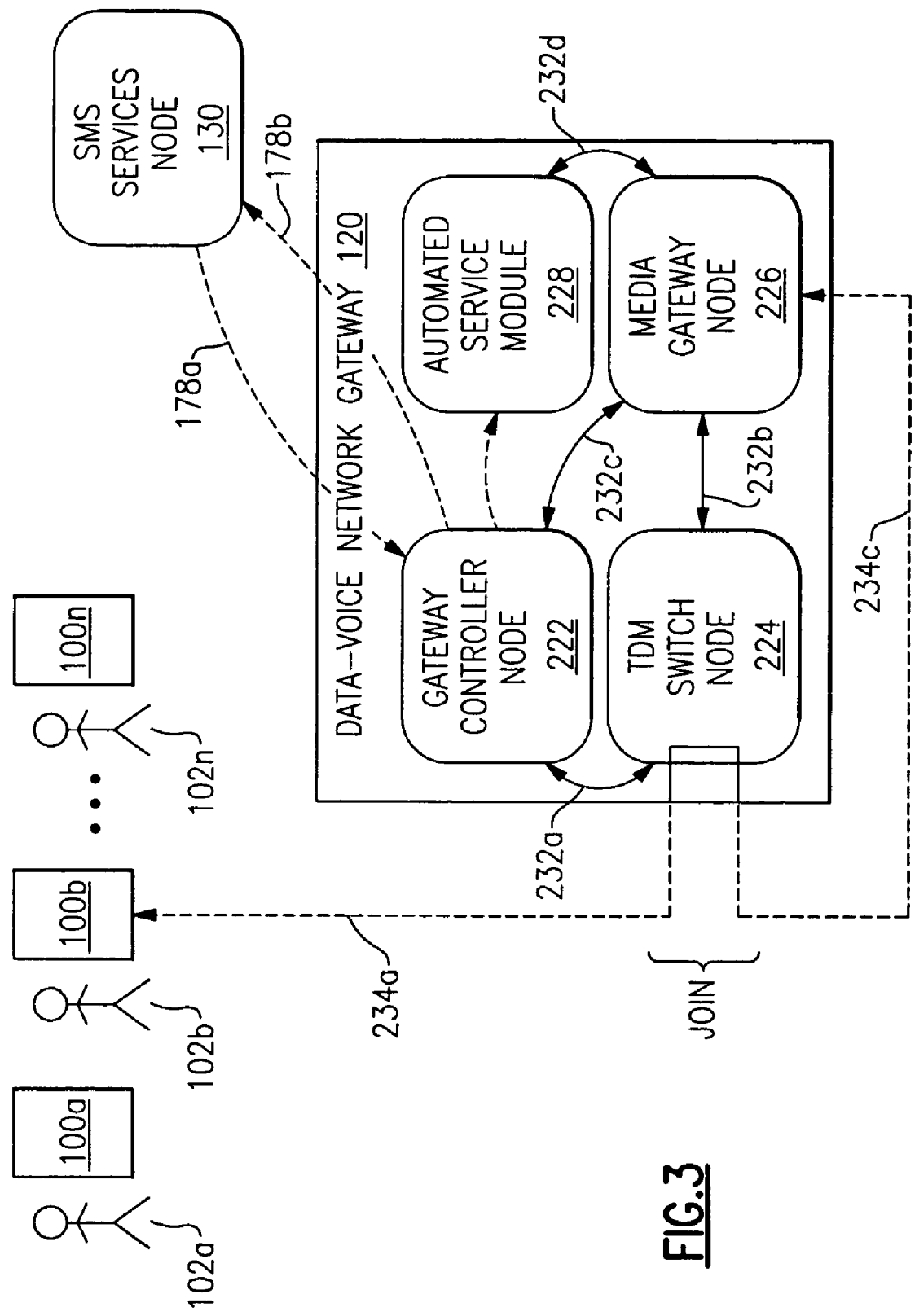
FIG. 3 is a block diagram illustrating the internals of an embodiment of the data-voice gateway that provides automated services to a user of an SMS and voice enabled communications device.

In another type of embodiment, automated interactive voice response (IVR) functionality is provided within the data-voice network gateway 120 (FIG. 3). In this type of embodiment, the IVR functionality interacts with the user 102 by receiving touch tone input or voice that is communicated from the user 102 of the device 100 and/or by transmitting synthesized and/or recorded audio/voice to the user via the device 100.

In a variation of this type of embodiment, the interactive voice response functionality provides automatic speech recognition of voice communicated from the user 102 via the device 100 and provides transmission of text to synthesized speech to the user 102 via the device 100. In some embodiments, communications 180a and 180b can be implemented to carry VoIP data between the voice services node 140 and the data-voice network gateway 120.

As shown, the SMS relay node 110 and the voice relay node 112 both reside within the PLMN (wireless) network 150. The voice relay node 112 and the voice services node 140 both reside within the PSTN (wire line) network 190. The voice relay node 112 resides within both the PLMN (wireless) network 150 and the PSTN (wire line) network 190. The remaining servers and gateway reside outside of the PLMN (wireless) network 150 and the PSTN (wire line) network 190, and preferably reside within a managed Internet Protocol (IP) network 170.

Figure 2A:
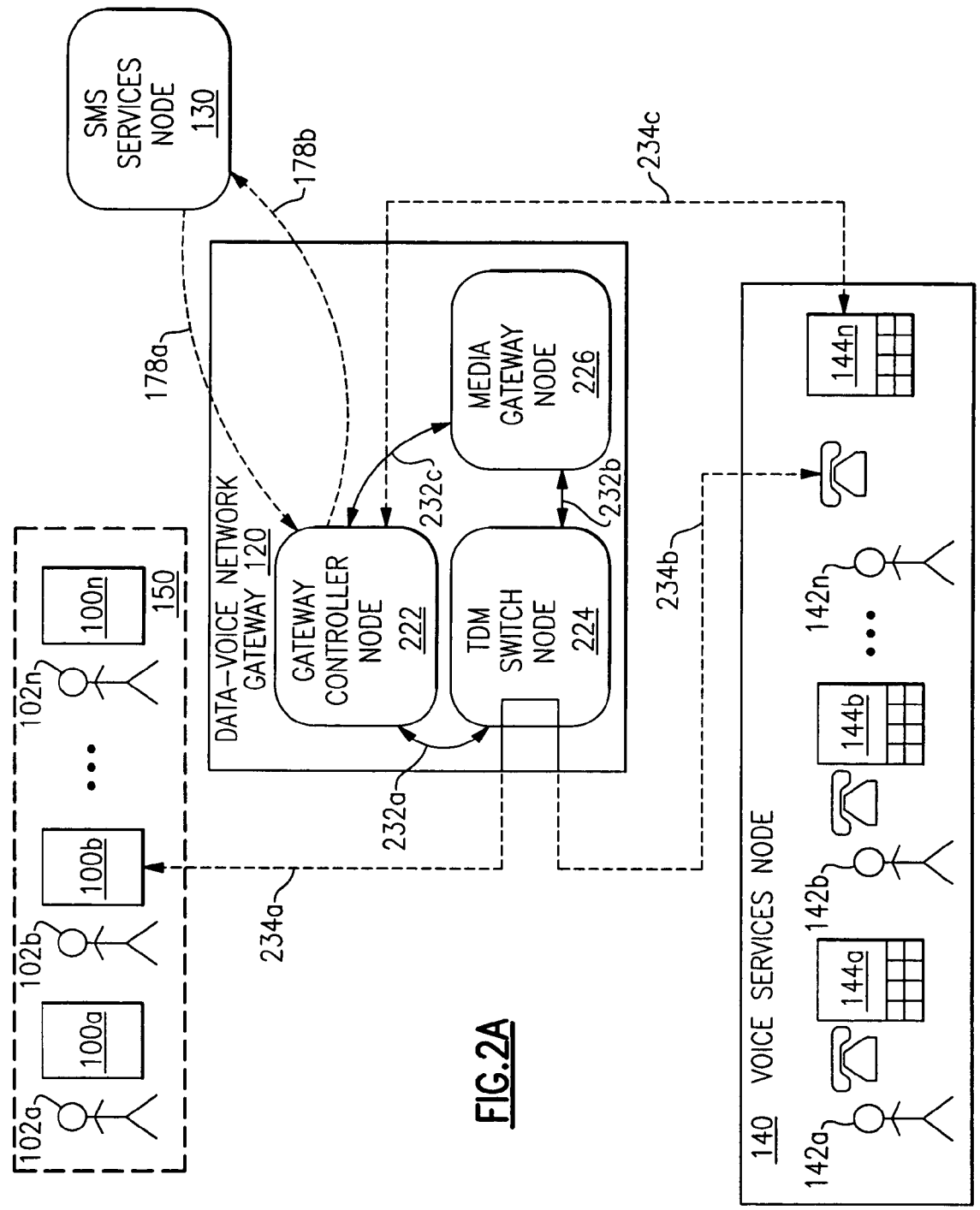
FIG. 2A is a block diagram illustrating internals of an embodiment of the data-voice gateway that interfaces with a circuit switched voice network and that provides human operator services to a user of an SMS and voice enabled communications device.

FIG. 2A is a block diagram illustrating an embodiment of the internals of the data-voice gateway 120 that interfaces with a circuit switched voice network 190 and that provides human operator assistance to the user 102b of a data and voice enabled communications device 100. In this embodiment of the data-voice gateway 120 is implemented as a sub-network of nodes 222-226 which interoperate to enable interaction with a user 102a-102n of a communications device 100a-100n via data and/or voice types of sessions.

As shown, the data-voice gateway 120 includes a data-voice gateway controlling node 222, also referred to as a gateway controller node 222 or as an XML gateway node 222, a time division multiplexing switch node 224 and a media gateway node 226. The gateway controller node 222 communicates with the TDM switch node 224 via communication channel 232a and communicates with the media gateway node 226 via communication channel 232c.

The TDM switch communicates with the media gateway 226 via communications channel 232b The communications channels 232a-232c are preferably configured for the transmission of Internet Protocol (IP) and UDP data communications protocols. The communications channel 232b is preferably a dedicated channel, such as a hard wired connection.

The TDM switch node 224 is configured to provide circuit switching between telephone lines. A "telephone line" is a channel (path) of telephony communication between two entities, such as between two people. A "telephone line" is not necessarily an individual wire. Many "telephone lines" may exist on a single wire or an optical fiber at one time. Telephony communication typically occurs between two people, but can also occur between a person and an automated interactive voice response system.

The TDM switch node 224 performs a telephony (circuit) connection between a first person and a second person by connecting a first telephone line associated with a first telephone that is used by a first person to a second telephone line associated with a second telephone that is used by a second person. Likewise, for example, the TDM switch node 224 can connect the first telephone line to a third telephone line associated with an interactive voice response system. The aforementioned "telephone lines" are also be referred to as "call legs".

The TDM switch node 224 is configured to be controlled via the communication of commands, also referred to as request communications that are received via its communications interface. The TDM switch node 224 receives request communications via the communications channel 232a and performs actions where appropriate in response to each received request communication, and transmits a response communication to the source of the request communications via the communications channel 234a where appropriate.

As shown in FIG. 1, the data-voice network gateway 120 receives a communication 178a from the SMS services node 130 via the gateway controller node 222. The gateway controller node 222 processes the communication 178a in order to initiate a voice session with the user 102 of the device 100. The gateway controller node 222 processes the communication 178a in part, by directing the operation of the TDM switch node 224 and/or the operation of then media gateway node 226, depending upon the particularities of the request communication 178a.

In one type of scenario, the communication 178a requests the initiation of a voice session between the user 102b and a human operator. In this scenario, the gateway controller node 222 directs the TDM switch 224 to initiate a first "call" the user 102b by dialing a particular telephone number to "ring" the communications device (wireless telephone) 100b associated with the user 102b. Also, the gateway controller node 222 directs the TDM switch 224 to initiate a second "call" to an available operator 142n in a similar manner as calling the user 102b. The telephone number of the user 102b is included within the communication 178a transmitted from the SMS services node 130.

The aforementioned "calls" respectively establish a first call leg 234a between the TDM switch node 224 and the user 102b and a second call leg 234b between the TDM switch node 224 and the available operation 142n. The gateway controller node 222 then directs the TDM switch 224 to join the first and the second call legs together so that the available operator is listening to the "ring" of the communications device 100 and waiting for the user 102 to answer the first call.

If and when the user 102b answers the ringing of the first call 234a, the operator 142n and the user 102b can initiate a voice conversation (dialog). If the user does not answer, but a voice mailbox associated with the device 100 answers the first call, the operator 142n can leave a voice message for the user 102b including contact information.

Optionally, the gateway controller node 222 communicates information to the operator to assist the operator 142n to provide services to the user 102b. If a prior SMS session has been established between the SMS services node 130 and the user 102b, information describing the status of and events occurring during the prior SMS session can be included within the communication 178a and relayed by the gateway controller node 222 within the communication 180a to the voice services node 140 via data network communication 234c. The communications 234b and 234c are included within the communication 180a of FIG. 1.

Figure 2B:
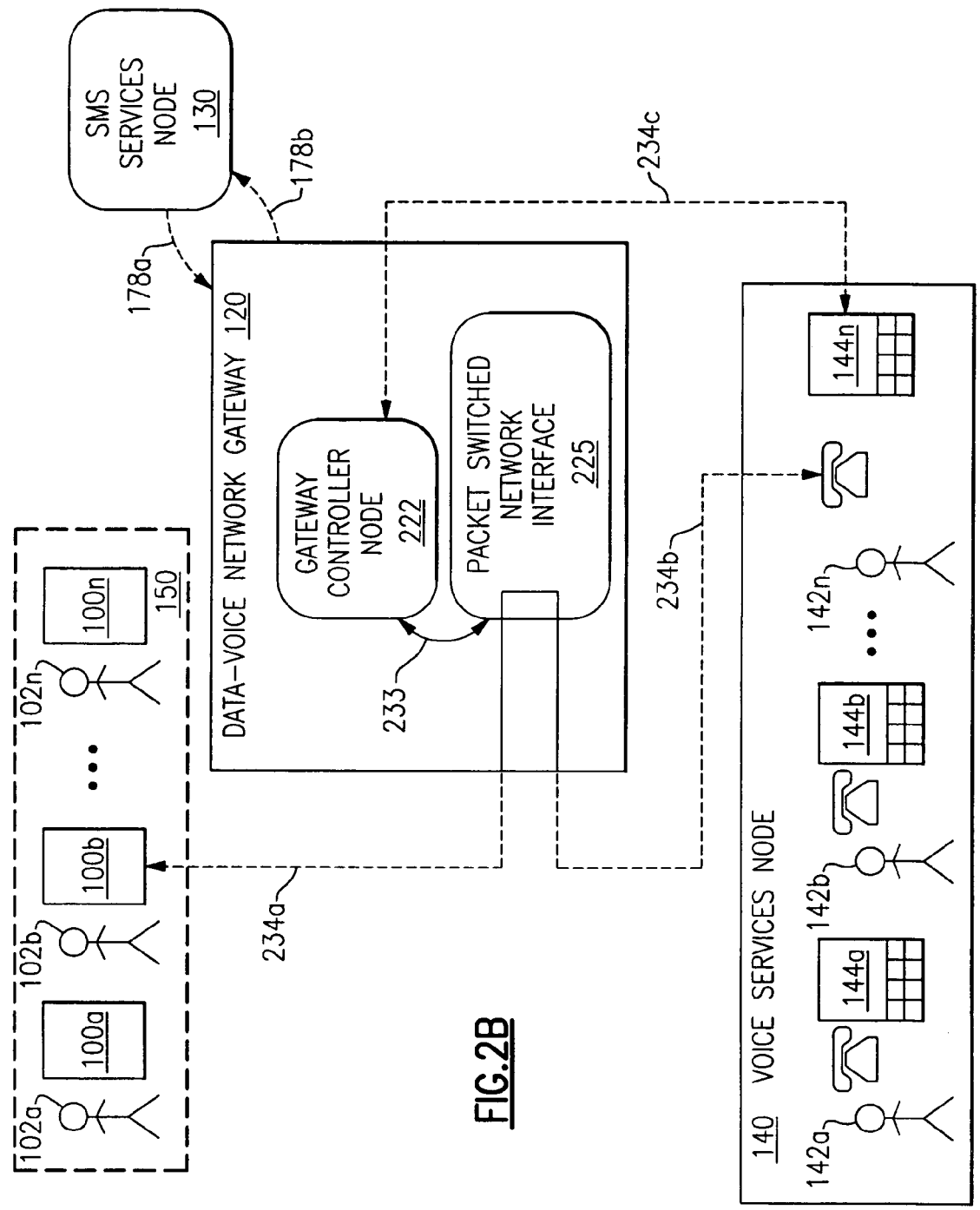
FIG. 2B is a block diagram illustrating internals of an embodiment of the data-voice gateway that interfaces with a VoIP network and that provides human operator services to a user of an SMS and voice enabled communications device.

FIG. 2B is a block diagram illustrating internals of an embodiment of the data-voice gateway that interfaces with a packet switched voice network 190 and that provides human operator services to a user of an SMS and voice enabled communications device 100b. As shown, unlike the embodiment of FIG. 2A, no interface to a circuit switched network is employed by the data-voice network gateway 120. As a result, no TDM switch 224 and no media gateway 226 is included within this embodiment of the data-voice network gateway 120.

Instead, the data-voice network gateway 120 interfaces with a VoIP network 190 that provides for communication of voice that is encoded as digital data. In some embodiments, the VoIP network supports the communication of the Internet Protocol (IP) and further, the communication of digitally encoded voice via the Internet Protocol (VoIP).

In this type of embodiment, the gateway controller node 222 is configured to interface with a packet switched network interface 225 via a communications channel 233a. In some embodiments, the packet switched network interface 225 is implemented as hardware and software, such as one or more network interface boards (cards) attached to a bus within the gateway controller node itself 222. In other embodiments, packet switched network interface 225 resides on a network addressable node, other than the gateway controller node 222, within a sub-network of the data-voice network gateway 120.

In this type of embodiment, the call legs 234a and/or 234b may not reside entirely over a packet switched network. For example, a circuit switched voice network that communicates with the telephones associated with the operators 142a-142n may reside inside the facilities of the voice services node 140. Likewise, a circuit switched voice network that communicates with a radio-frequency (RF) tower for the wireless local network 150 may reside inside of the voice relay node 112. In this type of embodiment, other gateway(s) that convert between digitized voice packets and circuit switch voice would reside along call legs 234a and/or 234b, such as within the facilities of the voice relay node 112 and/or the voice services node 140.

In some embodiments, the communications device 100b may be implemented as a WiFi or WinMax telephone to enable transmission and reception of digitized voice packets, such as VoIP packets, directly from and to the device 100b and without a need for circuit switching along the call leg 234a. Likewise, the telephones associated with the operators 142a-142n may be implemented in the same manner.

FIG. 3 is a block diagram illustrating an embodiment of the internals of the data-voice gateway 120 that provides automated service module 228 assistance to the user 102b of a data and voice enabled communications device 100b. In one use scenario, the communication 178a requests the initiation of a voice session between the user 102b and an automated service 228, such as an automated directory assistance service.

In this scenario, the gateway controller node 222 directs the TDM switch 224 to initiate a first "call" 234a to the user 102b by dialing a particular telephone number to "ring" the communications device (wireless telephone) 100b associated with the user 102b. The gateway controller node 222 also directs the TDM switch 224 to initiate a second "call" 234c to the particular automated service module 228 that is addressed via a "port number". The telephone number of the user 102b and the port number of the automated service module 228 are included within the communication 178a transmitted from the SMS services node 130.

The aforementioned first and second "calls" 234a, 234c respectively establish a first call leg 234a between the TDM switch node 224 to the user 102 and a second call leg 234c between the TDM switch node 224 and the media gateway node 226. The second call leg 234c is for the purpose of communicating with a particular automated service 228 identified via the port number, via the media gateway node 226. An IP type of call leg 232d connects the media gateway node to the automated service node 228. The gateway controller node 222 then directs the TDM switch node 224 to join the first 234a and the second call legs 234c together so that the operating state of the automated service module 228 is in waiting mode for the user 102b to answer the first call 234a.

The call to the particular automated service 228 via the port number is actually routed through the media gateway node 226. The media gateway node 226 translates voice received from the user 102b into digitized voice and communicates the digital voice to the automated service 228 via the communications channel (IP call leg) 232d.

In some embodiments, when the user 102b answers the ringing of the first call, the automated service 228 transmits an initial voice message, encoded as digitized voice, to the media gateway 226 via the communications channel 232d. The media gateway 226 translates the digitized voice into audio voice and communicates the audio voice to the user 102b via call leg 234c, the TDM switch 224 and the call leg 234a joined with the call leg 234c. The initial voice message may have been previously translated from recorded audio or translated from text that has been converted into digitized voice via a text to synthesized speech module.

In some embodiments, the automated service 228 is designed to receive touch tone input (FIG. 4) from the user 102b. In other embodiments, the automated service 228 is designed to receive voice input from the user 102b that is translated into textual information via an automated speech recognition module. In other embodiments, the automated service 228 is designed to receive both touch tone and voice input from the user 102b (See FIG. 4).

If the automated service 228 is designed to receive voice input from the user 102b, the media gateway 226 translates the audio representation of the users' voice into digitized voice data and communicates the digitized voice data to the automated service 228 via the communications channel 232d. The automated service 228 employs automated speech recognition to interpret the semantics of the user's voice and text to synthesized speech to respond to the user 102b.

Figure 4:
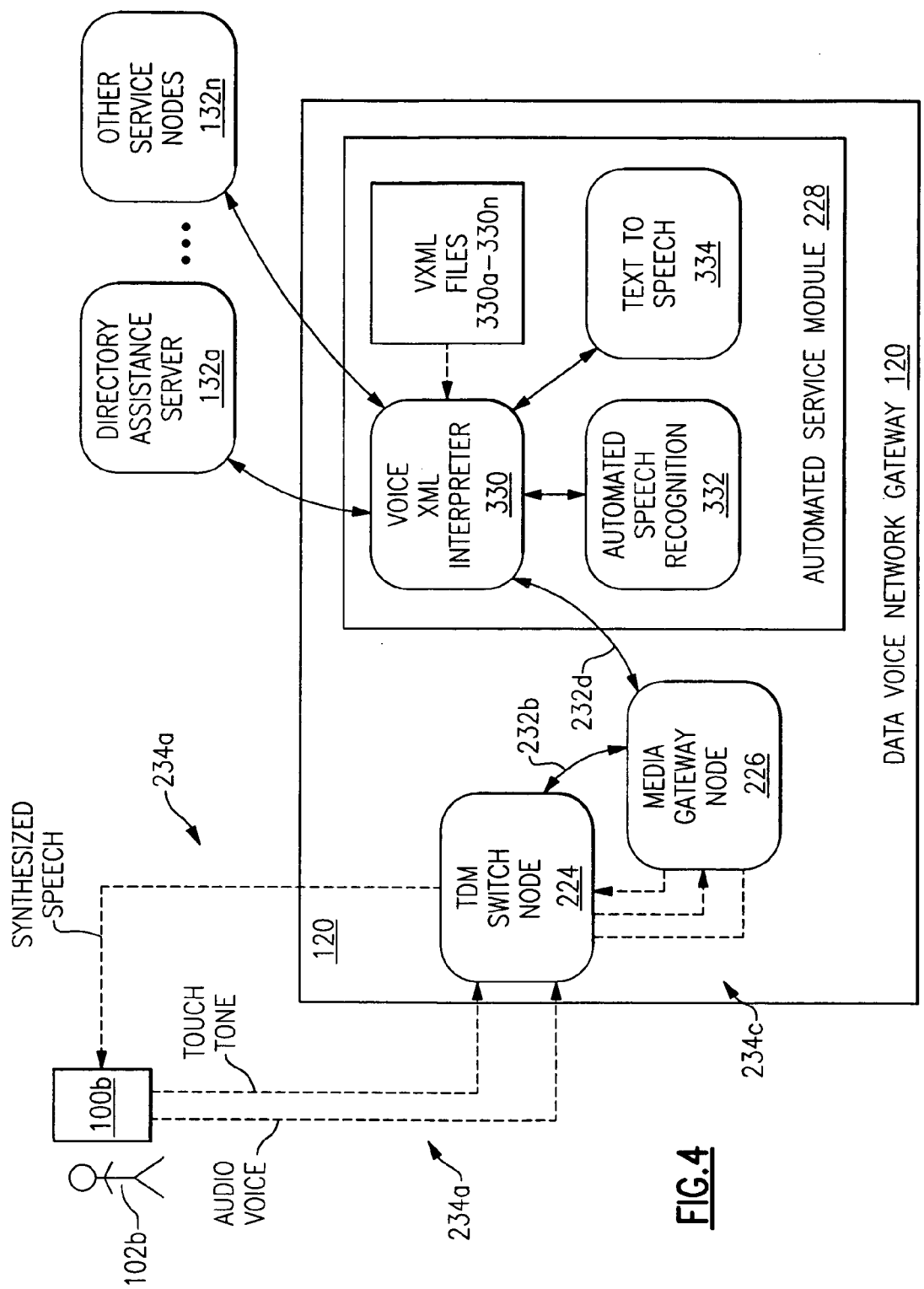
FIG. 4 is a block diagram illustrating the internals of an embodiment of the automated service module of the data-voice gateway.

FIG. 4 is a block diagram illustrating an embodiment of the internals of the automated service module 228 of the data-voice gateway 120 of FIG. 1. As shown, the automated service module includes a VoiceXML interpreter module 330, an automatic speech recognition module 332 and a text to speech module 334. The automated service module 228 receives and inputs digitized audio from the media gateway node 226, in the form of digitized voice or digitized touch tones via the communication channel (IP call leg) 232d. The automated service module 228 outputs digitized audio to the media gateway node 226, in the form of digitized and synthesized speech (voice) via the communication channel (IP call leg) 232d.

The VoiceXML interpreter module 330 is a software module that inputs and processes VoiceXML script from one or more files 330a-330n. In some embodiments, the files 330a-330n may reside on a other server nodes 132a-132n. The VoiceXML interpreter module 330 invokes and interoperates with the automated speech recognition module 332 to interpret the digitized audio data received from the user 102b. The VoiceXML interpreter module 330 invokes and interoperates with the speech to text module 334 to transmit digitized voice response communications to the user 102b.

While executing, the VoiceXML interpreter module 330 may communicate with other service nodes 132a-132n to store and/or retrieve information to conduct the interactive dialog between the automated service module 228 and the user 102b. For example, a directory assistance request received from the user 102b in the form of digitized voice 232d can be translated into text by the automatic speech recognition module 332 and transmitted to the directory assistance server 132a by the VoiceXML interpreter 330. In response, the directory assistance server 132a transmits directory assistance information in the form of text to the VoiceXML interpreter 330. The text to speech module 334 translates the text into digitized voice before being communicated to the user 102b by the XML interpreter module 330.

In some embodiments, call control XML (CCXML) can be employed to implement an automated service, such as an interactive voice interface with a user 102b. Also, speech application language tags (SALT) can be employed within XML or other script to implement an automated service providing an interactive voice interface with a user 102b.

A flow of digitized audio, such as communicated through the communication channel 232d, is also referred to as an audio stream. The flow of digitized audio that is communicated using the IP protocol, such as communicated by the communication channel 232d, is also referred to as an IP call leg 232d. An IP call leg functions like an audio call leg 234a-234c to communicate audio between two locations. But unlike an audio call leg 234a-234c, an IP call leg 232d can be further controlled (manipulated) by digital logic, such as by one or more software modules.

At some point in time, the dialog between the user 102b and the automated system 228 will end as a result of an action by the user 102b and/or by the automated system 228. Optionally, the automated system may transfer its role in the dialog to another automated service or to a human operator.

In some embodiments, the automated service module 228 resides as a software module on the gateway controller node 222. In other embodiments, the automated service 228 resides on another node residing with the data-voice network gateway sub-network 120.

Figure 5:
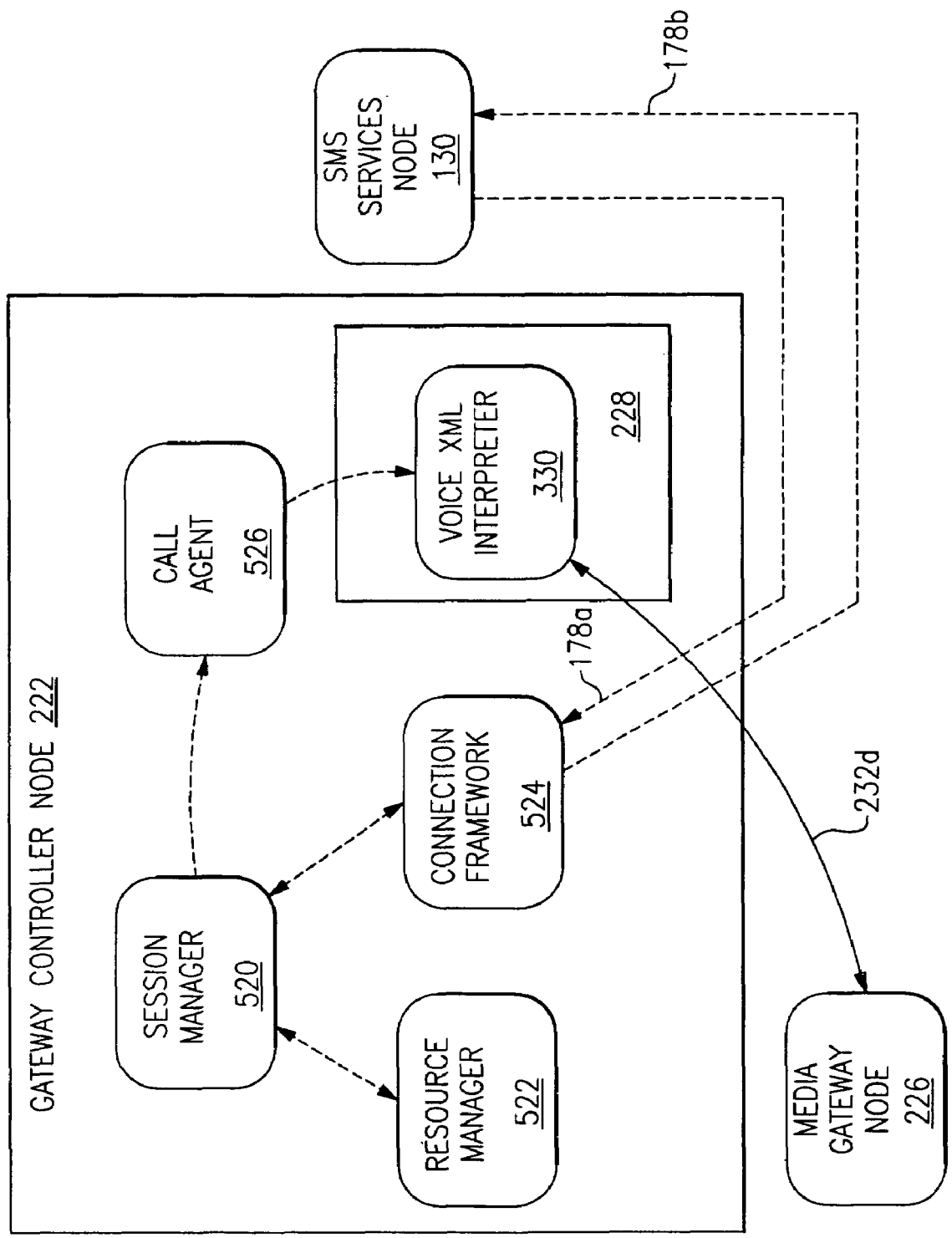
FIG. 5 is a conceptual block diagram illustrating the internals of an embodiment of the gateway controller node of the data-voice gateway.

FIG. 5 is a conceptual block diagram illustrating the internals of an embodiment of the gateway controller node 222 of the data-voice gateway 120. The gateway controller node 222 is configured to receive communications from the SMS services node 130 and to direct the operation of the TDM switch node 224 and the media gateway node 226. The gateway controller node includes many software components including a session manager module 530, a resource manager module 522, a connection framework module 524 and a call agent module 526.

The gateway controller node 222 receives a communication 178a requesting the initiation of a voice session with a user from the SMS services node 130 via the connection framework module 524. Information of the request communication 178a is communicated to the session manager 520. The session manager 520 communicates with the resource manager 522 regarding whether resource availability enables the allocation of a new session. The resource manager 522 responds to allow or disallow the allocation of a new session.

If a session can be established, the session manager spawns a call agent 526 to establish audio and IP call legs to support the voice session. The call agent spawns any software modules required to conduct a dialog, such as an automated service module 228, where applicable. The call agent monitors the status of the session and performs call control operations upon the session. In some embodiments, a SIP protocol connection that is processed by the connection framework 524, is used to perform call control on the dialog, stream of digitized audio being communicated over communications channel (IP call leg) 232d.

For sessions between a user and an operator, call control operations can place an entity on hold while another entity receives back ground music, for example. For sessions between a user and an automated service, call control operations can re-direct the session to another automated service in response to events occurring within the prior session.

Figure 6:
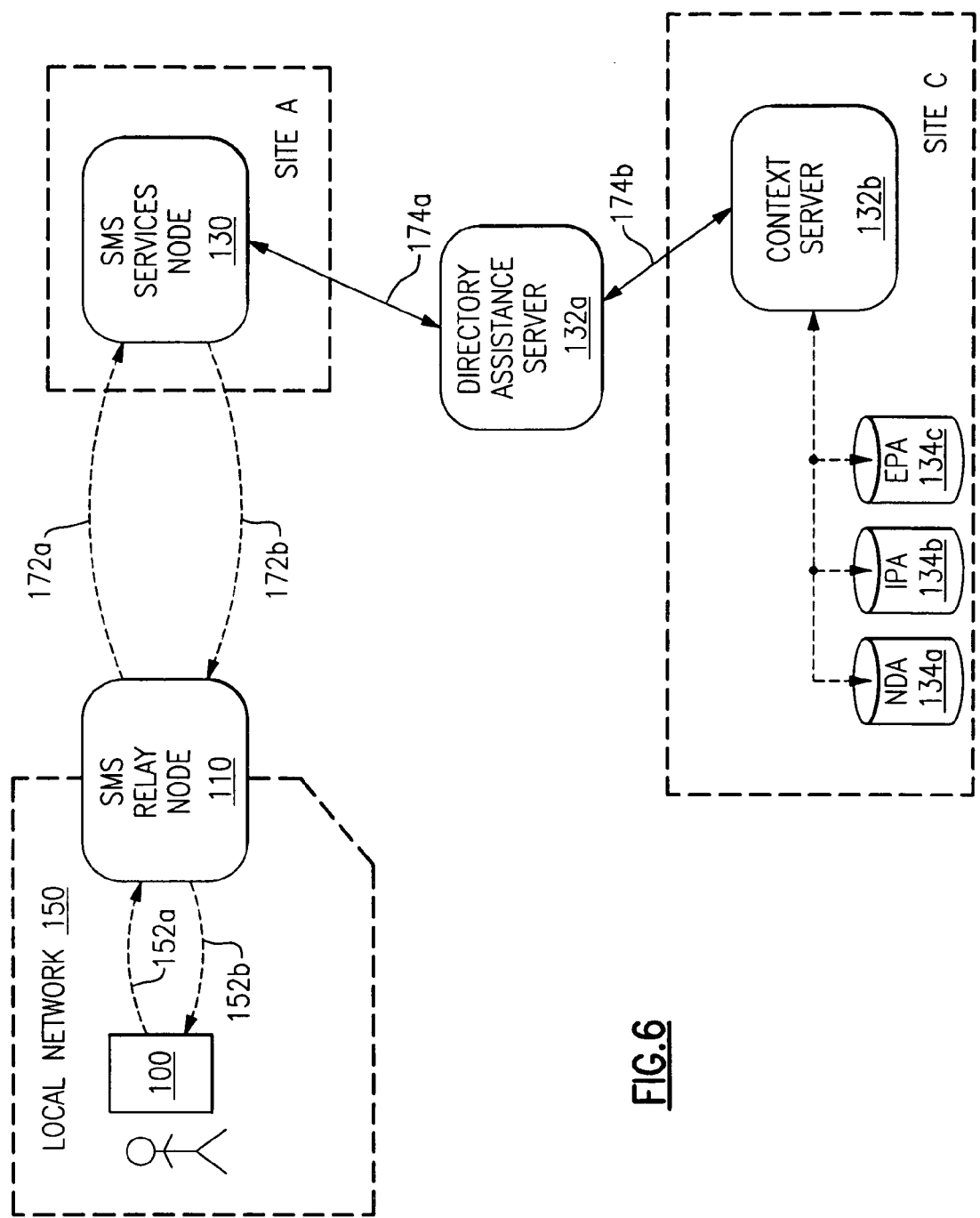
FIG. 6 is a block diagram illustrating an embodiment of a system providing directory assistance services to users SMS protocol enabled devices.

FIG. 6 is a block diagram illustrating an embodiment a system of providing directory assistance services to users of SMS protocol enabled devices. As initially described in association with FIG. 1, directory assistance can be provided during an SMS protocol session between the user 102 of the communications device 100 and the SMS services node 130.

In one type of use embodiment, the user 102 of the device 100 transmits a request for directory assistance within a communication 152a that is addressed to an SMS services node 130, also referred to as an SMS server 130, having a known network protocol address. The request is represented by text data transmitted within the communications 152a and 172a.

The SMS services node 130 receives the request within communication 172a and determines what actions are required to process it. Typically, a request for directory assistance includes name information for which telephone number and/or address information is sought by the requesting user 102. The name information is at least a portion of a name of an entity. An entity can be of a person, a business or government agency, for example.

The SMS services node 130 transmits a communication via communication channel 174a to a directory assistance server 132a to access telephone number and/or address information associated with the name information communicated from the user 102. If the telephone number and/or address information is not locally available to the directory assistance server 132a, the directory assistance server transmits a communication 174b to a content server 132b.

The content server 132b has direct access to a plurality of national directory assistance databases 134a, a plurality of international directory assistance databases 134b and a plurality of enhanced directory assistance databases 134c. The content server 132b transmits a response communication via communication channel 174b to the directory assistance server 132a which relays the communication over communications channel 174a to the SMS services node 130.

As described for FIG. 1, the SMS services node transmits a response communication 172b to the communications device 100 via the SMS relay node 110. The response communication includes telephone number and/or address information sought by the user 102. Typically, the SMS services node 130 transmits a response communication 172b including at least one item (listing) of telephone and/or address information associated with a name information of the original request communication 152a.

In some embodiments, within the request communication 152a, the name information can be represented by a portion of a name. This feature is convenient in circumstances where a full and correct spelling of the name may not be known to the user 102 at the time of the request communication 152a.

Optionally, at least one item of telephone and/or address information of the response communication 172b is not fully revealed (at least partially hidden) so that the user 102 is not provided any complete listings. In this circumstance, the user has the option to request that a particular listing of telephone and/or address information be fully revealed. To do this, the user transmits a request communication 152a to the SMS services node 130 requesting that the telephone number and/or address information be revealed. The SMS services node 130 then communicates a response 172b including the fully revealed telephone number and/or address information (listing). In some embodiments, the providing of the fully revealed listing can constitute a billing event. Optionally, the system records a billable event and charges the user accordingly upon providing the telephone number and/or address information.

The transmission of a request communication 152a from the device 100 and a resulting response communication 172a transmitted from the SMS services node constitute an SMS message exchange. The SMS services node 130 is configured to maintain a persistent SMS communication session with the communications device 100 indefinitely and beyond one SMS message exchange.

In some circumstances, multiple items (listings) of telephone number and/or address information may potentially match the name information communicated from the user 102. As a result, the response communication 172b includes multiple listings.

If the response communication 172b includes multiple listings or listings longer than a particular limit, for example 160 characters, the response 172b can be divided into multiple segments of SMS messages. The listings are received by the device 100 and displayed (formatted) by the device 100 for user 102 viewing and selection. An example embodiment of a format of a listing represented as a template is shown as follows.

```
<Listing Index of the Total Number of Listings>
<Listing Name>
<Address>
<City, State, ZIP>
<Telephone Number>
```

An example of (2) such listings are shown as follows:
1 of 2
Home Depot
123 Main St
Atlanta, Ga. 30342
404-123-4567
2 of 2
Home Depot
678 Peachtree Blvd.
Atlanta, Ga. 31014
404-443-8400

As shown above, the first listing has an index identifier of "1" of 2 total listings and the second listing has an index identifier of "2" of 2 total listings. The user 102 can later use the index identifier to reference a particular listing using other request codes. A range of listings, identified by a corresponding range of indexes, can be communicated to the user 102 per SMS message communication 172a.

An example of a partially revealed listing, excluding telephone number information, is shown as follows:

1 of 2
Home Depot
123 Main St
Atlanta, Ga. 30342
2 of 2
Home Depot
678 Peachtree Blvd.
Atlanta, Ga. 31014

An example of a lookup with caption record is shown as follows:

1 of 1
Atlanta General Hospital
Outpatient Services
100 Peach Street
Atlanta, Ga. 30333
404-555-9999

In some embodiments, reverse directory assistance services are provided. The user communicates telephone number information within the request communication 152a and the SMS services node 130 responds with name and/or address information associated with the telephone number information, if the telephone number is listed. If the telephone number is not listed, the SMS services node 130 responds with a message informing the user 102 that the telephone number is not listed and cannot be provided. Optionally, the name and/or address information is not fully revealed until a billable request is transmitted by the user 102 to the SMS services node 130.

In one type of embodiment, a request syntax communication for a business, residential and government directory assistance search, includes two fields that identify a name and a locality and that are separated by one or more spaces (<name><locality>). Examples of this type of syntax include "Home Depot 30342", "Starbucks Atlanta Ga.", "Doppler I 10111", and "Motor Vehicles Atlanta Ga.".

Additionally, a plurality of alphabetic request codes (A-Z) and numerals (0-9) are recognized within a request syntax communication from the user 102. If the user 102 fails to remember any of the alphabetic request codes, he may obtain help information by sending a help request code "H".

Some embodiments of the invention provide various types of flow control functions. Flow control can be exercised in circumstances where the number of listings exceeds a pre-determined amount. For example, when the number of listings exceeds a pre-determined amount that equals a configurable parameter associated with the device 100, the SMS services node 130 informs the user and advises the user to communicate a revised request that would likely result in fewer listings. In response, the user can communicate a revised request 152a to the SMS server. An embodiment of such a prompt to the user is shown as follows.

"TOO MANY LISTINGS SELECT
1-> RESIDENCE
2-> BUSINESS
3-> GOVERNMENT"

Advanced parsing of the request communication can reveal certain types of mistakes. Examples of such mistakes include typographical or spelling errors, mismatched zip codes etc. The SMS service node 130 can transmit types of communications 172b to the user 102 including suggestions to correct mistakes previously communicated by the user and that allow the user to select among multiple alternative request choices. Alternatively, the user can transmit a request code to the SMS services node 120 to specifically correct or ignore a previously communicated request.

The user can communicate 152a various other request codes to the SMS services node. These codes are listed as follows.

N Receive next listing if multiple listings are available;
P Receive previous listing if multiple listings are available;
O Request Operator backing;
L Last Request; and
H Send help information.

In an exemplary SMS session, a user 102 transmits a request for directory assistance by communicating 152a the text string "Dominos 32072" to the SMS services node 130. In response, the SMS services node 130 transmits the following SMS message 172b to the device 100.

1 of 8
Domino's Pizza
461 Ponce De Leon Ave NE
Atlanta, Ga. 30308
404-874-0030

In response, the user transmits a request 152a identified by a request code "N" to the SMS service node 130. In response, the SMS services node 130 transmits the next listing to the user 102 of the device 100 as follows.

2 of 8
Domino's Pizza
3300 Buford Hwy
Atlanta, Ga. 30329
404-872-3000

The user 102 can transmit a request identified by the request code "P" to the SMS service node 130. In response, the SMS services node 130 transmits the previous listing to the user 102 of the device 100 as follows.

1 of 8
Domino's Pizza
461 Ponce De Leon Ave NE
Atlanta, Ga. 30308
404-874-0030

The user 102 can transmit a request identified by the request code text "O" to the SMS service node 130 to specifically request voice communication with a human operator. In response, the SMS services node 130 establishes a voice session between the user 102 and an available human operator as described in association with FIG. 2A. This feature is also referred to as operator backing. Operator backing allows a user to obtain operator assistance when the user fails to obtain the correct listing through the SMS session.

In some embodiments, each listing of a multiple listing search result can contain a listing index (sequence) number, such as 1 of 10. Users can request additional listings by replying with the "N" request code to receive the next listing. Other request codes can be defined to request other actions of the SMS service node 130.

Short codes are SMS addresses that are employed to identify and distinguish different SMS users and different SMS services. For example, a short code having a value equal to 411 can be assigned to identify a particular SMS based directory assistance service and a short code having a value equal to 2411 can be assigned to identify another SMS based service.

As described earlier, SMS communications that are longer than a particular limit, for example 160 characters, may be sent as multiple SMS messages, also referred to as multi-segmented SMS messages. A network designed in accordance with the global system for mobile communication (GSM) standard would enforce the 160 character limit while other networks would likely enforce other limits.

Simple formatting rules can be employed to divide communications into multiple messages. For example, a phone number may not be split between two messages. In some embodiments, billing codes or 'sent from' addresses can be selected to control which SMS messages are billable. For example, for multi-segmented messages, a first message can be defined as the start of a particular session and subsequent messages that reside within the particular session would not be further billed. But a message defining the start of a new session could be billed.

In some embodiments, the invention supports various reporting functions. For example, an accounting component can provide daily statistics of total messages sent, what type of message (residential, business, government, reverse DA), and any associated billing data. In some embodiments, the invention supports the implementation of various pricing components. These may include, for example, licensing fees for system operator software, setup and maintenance fees, data access fees, and transaction fees per MO SMS.

In some embodiments, the invention provides mobile originated (MO) SMS international directory assistance (IDA) 134b and/or an enhanced directory assistance (EDA) 134c. Enhanced directory assistance 134c provides access to information relating to various entities, activities and events. For example, enhanced directory assistance information may include such as scheduled movie showing times and ski reports. An example of such a service allows a user to transmit a request identified by the following text.

Mov Shrek2 32072.

In response, the SMS services node 130 transmits information describing a schedule of movie showing times over the next 4 hours, or alternatively over other periods of time, for which the movie Shrek2 is scheduled to be shown in theaters, inside or proximate to the geographic area of the ZIP code 32072.

Other requests codes for other enhanced data services can be made available to the user. For example, the following request codes can be defined as follows:

| Request Code | Description |
| --- | --- |
| MOV | Movie Listings and Times by Zip/City and Movie |
| RES | Restaurant Reviews by Restaurant |
| WEA | Weather Reports by Zip/City |
| STK | Stock Quotes by ticker |
| SPT | Sports Scores for NHL/MLB/NHL/NBA |
| LOC | Local Events by ZIP/City |
| AIR | Airport Delays by Airport code/ZIP/City |
| SKI | Ski Reports by Resort |
| TRA | Traffic Reports by ZIP |

In some embodiments, the invention provides personalized request codes. A web interface or request codes (commands) enable a user to personalize his request codes. For example, a user may want to create another request code to represent a movie query. In this case the user may define an "alias" request code for his personal use. For example, the request code "M" can be set to be equivalent to the request code "Mov", identifying a <movie> request code. As applied to the previously described example, the request regarding the movie "Shrek2" can be indicated via the request syntax "M Shrek2" when communicated by the user 102, in addition to the default request syntax "Mov Shrek2 32072" used apart from the personalized request code syntax version.

Session based billing provides for a correlation of each response from the SMS services node 130 with the original requests communicated from the user 102. This enables an SMS service provider to charge users on a per-session basis, as opposed to a per-message basis.

Some session events are classified (configurable) as non-billable events. In some embodiments, certain MO messages to be tagged as non-billable events. Examples include request communications to view next/previous set of listings within the same session and to respond to error messages communicated from the SMS services node 130. Optionally, requests for operator backing and lost information due to a communication failure messages may be tagged as non-billable events.

Configurable billable events also may be tagged by default. These may include certain requests for which the user is charged. Examples include a post-TTL (Time-to-Live) query for a recent listing. Such a default configuration may be changed by the SMS service provider through an interface, for example a web-based interface, to SMS services node 130. A configurable TTL parameter offers flexibility to the service provider to bill messages differently within a certain time period. For example, if a user asks for the same listing within the TTL time period, a chronological window of 10 minutes for example, the provider may decide not to charge the user again for the same listing.

A message throttle feature allows the SMS services node 130 to execute flow control so that when the number of listings exceeds a limit, the SMS services node 130 can suspend communication of SMS messages to the user 102 and prompt the user 102 for more information to narrow the directory assistance search.

A message concatenation feature allows the SMS services node 130 to divide long messages (exceeding 160 characters) into multiple segments. Advanced text parsing in the SMS services node 130 allows pre-processing of request communications from the user 102 to identify errors. The SMS services node 130 uses procedural scripts that look for missing information within a request communication 152a, such as spelling mistakes, typographical errors etc. When errors are found, the SMS services node 130 transmits a response communication 172b to the user 102 as a prompt including suggestions for correcting the previous request communication 152a.

In some embodiments, the SMS services node 130 employs multiple short codes for record keeping purposes. The SMS services node 130 assigns a short code as a source address to each communication 172b that is transmitted from the SMS services node 130 and addressed to each of one or more devices 100. The SMS services node uses the assigned short codes to associate a request communication 172a with a response communication 172b while it 130 communicates with a plurality of devices 100. Service providers can use this functionality to offer flexible session based billing.

Some embodiments support bilingual user interfaces, such those which support both English and Spanish, for example. Communication devices 100 capable of supporting special characters, can be provided a user interface consistent with such special character support.

Figure 7:
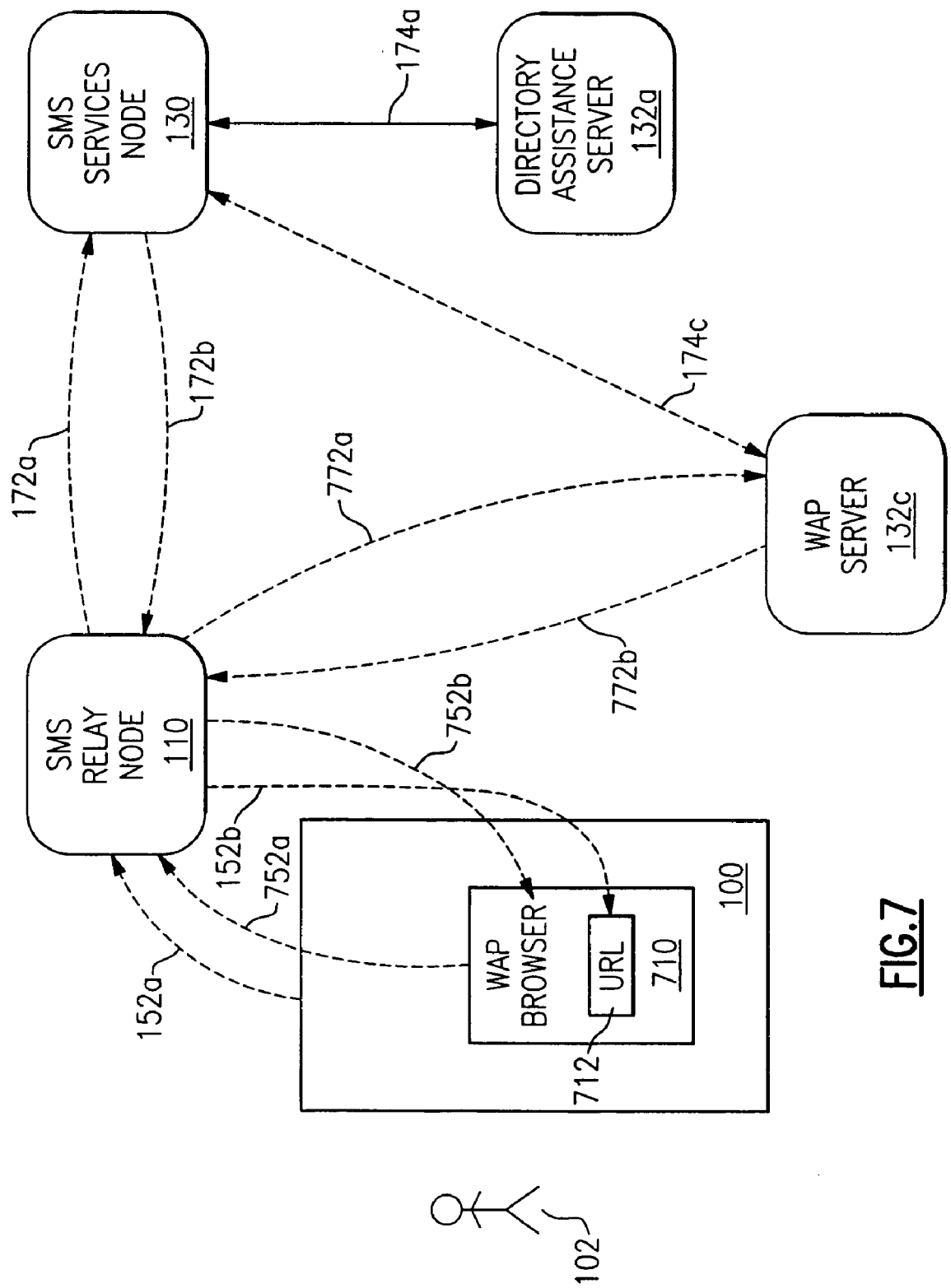
FIG. 7 is a block diagram illustrating an embodiment a system of providing SMS and WAP based services to users of SMS and WAP enabled communication devices.

FIG. 7 is a block diagram illustrating an embodiment a system of providing SMS and WAP based services to users of SMS and WAP enabled communication devices. As shown, a response to a request communication 152a for directory assistance can yield a response 172*a* including telephone number and/or address information as described for FIG. 6. The response can further include uniform resource locator (URL) information 712 that is included within the response communication 152*b* and stored inside of the device 100. The URL includes an IP address for the WAP server 132*c*.

As shown, the device 100 includes a WAP browser 710. The user 102 can direct the WAP browser 710 to access the URL 712 and transmit a communication 752*a* that is addressed to the WAP server 132*c* via the SMS relay node 110. The communication 752*b* arrives at the WAP server as communication 772*b* and includes the URL 712 as a destination address for the WAP server 132*c*. In response, the WAP server 132*c* transmits a response communication 772*b* addressed to the device 100 via the SMS relay node 110. The response communication may include map and traveling information associated with a listing responding to the original request communication 152*a*. The response communication 772*b* is received by the device 100 as communication 752*b*.

The device 100 displays the communication 752*b* via the WAP browser 710. The WAP browser 710 displays the map and traveling information associated with a listing responding to the original request communication 152*a*. This type of response communication 172*b*, 152*b* is also referred to as a WAP Push message. A WAP push message can include a WAP server URL link that is transmitted from the SMS Services node 130 to the user 102 of the communications device 100. A WAP Push message can provide a broader menu of services to the user 102.

For example, if a user 102 receives a listing for Home Depot, he could be pointed to a WAP page via a URL within a WAP push message. The WAP page can include driving directions, maps, store hours, traffic reports, etc. that directed to the store location associated with the listing.

In some use scenarios, while viewing the WAP page, the user 102 can interact with the system via a voice session. In one type of use scenario, an explanation of the WAP page is provided by a human operator 142*a*-142*n*. Depending upon the capabilities of the device 100, the user 102 may be able to interact with the system via data session, such as an SNS, WAP or MMS session and simultaneously interact with the system via a voice session.

In other embodiments, like WAP, a multimedia messaging service (MMS) type of session can be provided to interact with communications devices having digital camera capabilities using an MMS server. In this type of embodiment, an MMS message referencing a digital image, is communicated to the device and displayed by the device 100 to the user 102. The user 102 may opt to continue to interact with the SMS services node 130 within an MMS session or to transition to a session of another type, as is the case with a WAP, SMS or a voice type of session.

Also, location based services can be provided to interact with communications devices 100 that are enabled to communicate location information to the system. Response communications from the SMS services node 130 to the device 100 would be conditioned upon the location of the device 100.

While the present invention has been particularly shown and described with reference to the preferred mode as illustrated in the drawing, it will be understood by one skilled in the art that various changes in detail may be effected therein without departing from the spirit and scope of the invention as defined by the claims.

I claim:

1. A system for providing information to a user of a short message service (SMS) enabled communication device, comprising:

an SMS server configured for communicating with an SMS enabled communications device during a first SMS session, said SMS server is configured for receiving one or more requests communicated from a user of said SMS enabled communications device and configured for causing a transmission of at least one of multiple types of response communications in response to receiving each of said one or more requests;

wherein each of said multiple types of response communications is a member of a set of types of response communications, said set including at least an SMS type of response communication and an audio type of response communication;

wherein said SMS server causes a transmission of said audio type of response communication in response to receiving one or more SMS request communications from said user, said audio type of response communication being a voice type of response communication; and wherein said voice type of response communication is an interactive voice session between said user and said system.

2. The system of claim 1 wherein said SMS enabled communications device is also enabled to communicate said voice type of response communication to said user and communicates said voice type of response communication to said user; and wherein said interactive voice session is between said user and a human operator of said system.

3. The system of claim 1 wherein said interactive voice session is between said user and a human operator of said system; and wherein said human operator is provided information describing a status of, and events occurring during, said first SMS session.

4. The system of claim 1 wherein said interactive voice session is between said user and a human operator of said system; and wherein said interactive voice session is terminated by said human operator and followed by the human operator causing a transmission of a response communication including a text to speech (TTS) or pre-recorded audio message.

5. A system for providing information to a user of a short message service (SMS) enabled communication device, comprising:

an SMS server configured for communicating with an SMS enabled communications device during a first SMS session, said SMS server is configured for receiving one or more requests communicated from a user of said SMS enabled communications device and configured for causing a transmission of at least one of multiple types of response communications in response to receiving each of said one or more requests;

wherein each of said multiple types of response communications is a member of a set of types of response communications, said set including at least an SMS type of response communication and an audio type of response communication;

wherein said SMS server causes a transmission of said audio type of response communication in response to receiving one or more SMS request communications from said user, said audio type of response communication being a voice type of response communication; and wherein said SMS server causes said transmission of said voice type of response communication by transmitting a voice session initiating communication to a data-voice network gateway.

6. The system of claim 5 wherein voice session initiating communication includes information describing a status of and events occurring during said first SMS session.

7. The system of claim 5 wherein said data-voice network gateway employs voice extensible markup language (VXML).

8. The system of claim 5 wherein said data-voice network gateway employs call control extensible markup language (CCXML).

9. The system of claim 5 wherein said data-voice network gateway employs speech application language tags (SALT).

10. The system of claim 5 wherein said data-voice network gateway employs session initiation protocol (SIP).

11. A system for providing information to a user of a short message service (SMS) enabled communication device, comprising:

an SMS server configured for communicating with an SMS enabled communications device during a first SMS session, said SMS server is configured for receiving one or more requests communicated from a user of said SMS enabled communications device and configured for causing a transmission of at least one of multiple types of response communications in response to receiving each of said one or more requests;

wherein each of said multiple types of response communications is a member of a set of types of response communications, said set including at least an SMS type of response communication and an audio type of response communication;

wherein said set of types of response communications further includes a wireless application protocol (WAP) type of response communication;

wherein said SMS enabled communications device is also configured to provide wireless application protocol (WAP) browser functionality that processes and displays said (WAP) type of response communication to said user;

wherein said SMS server causes the communication of a WAP push message to said SMS enabled communication device, said WAP push message optionally includes a uniform resource locator (URL) that is processed by said WAP browser functionality of said SMS enabled communication device; and wherein said WAP type of response communication includes map information for providing traveling directions to said user of said SMS enabled communications device.

12. A system for providing information to a user of a short message service (SMS) enabled communication device, comprising:

an SMS server configured for communicating with an SMS enabled communications device during a first SMS session, said SMS server is configured for receiving one or more requests communicated from a user of said SMS enabled communications device and configured for causing a transmission of at least one of multiple types of response communications in response to receiving each of said one or more requests;

wherein each of said multiple types of response communications is a member of a set of types of response communications, said set including at least an SMS type of response communication and an audio type of response communication; and wherein in response to receiving a first SMS request communication, said SMS server causes the transmission of a first SMS type of response communication by communicating a first SMS response communication to said user of said SMS enabled communications device and where a grouping of a request communication from said user and a subsequent response communication from said server defines an SMS message exchange and where one SMS session includes one or more SMS message exchanges before being terminated by either said user or said SMS server.

13. The system of claim 12 wherein a first request communication from said user includes a specific request for interactive voice communication with a human operator.

14. The system of claim 12 wherein upon communication of said first SMS request from said user, said SMS server causes a billable event to be recorded and/or causes a chronological window of a particular length of time to be initiated; and wherein re-communication of said first and/or said second request within said chronological window does not cause another billable event to be recorded.

15. The system of claim 12 where said SMS server provides information relating to telephone directory assistance;

wherein a first request communication from said user includes the name of an entity; and wherein an associated first SMS response communication from said SMS server includes telephone number and/or address information of one or more entities each having a name at least similar to said name of an entity; and wherein upon communication of said first request from said user, said SMS server causes a billable event to be recorded and/or causes a chronological window of a particular length of time to be initiated; and wherein re-communication of said first and/or said second request within said chronological window does not cause another billable event to be recorded.

16. The system of claim 12 wherein a request communication includes an association of an alias name with an original name of a particular request to enable said user to later communicate said alias name as a substitute for said original name.

17. The system of claim 12 wherein a second SMS request communication includes a next or a previous request that references a particular SMS response communication transmitted after or prior to transmission of said second SMS request communication to said SMS server.

18. The system of claim 12 wherein a second SMS request communication includes a correction request that requests revision to said first SMS request communication.

19. The system of claim 12 wherein said SMS server is configured to perform advanced parsing of said SMS request communication, said advanced parsing can perform a correct interpretation of an SMS request communication that includes incomplete and/or incorrect information, said incorrect information including spelling and/or typographical errors.

20. The system of claim 12 wherein said SMS server provides enhanced directory assistance information relating to various entities, activities and events;

wherein a first request communication from said user includes a first portion of information associated with an entity, activity and/or event; and wherein a first response communication includes a second portion of information associated with said entity, activity and/or event; and wherein said first portion includes a movie name and a zip code; and wherein said second portion includes one or more items of information, each said item of information constituting a movie listing and including at least a location and a time associated with a scheduled showing of a movie.

21. The system of claim 12 wherein said first SMS response communication includes a set of one or more items of information; and wherein each of said items of information is communicated in association with an identifier assigned by said SMS server.

22. The system of claim 21 wherein said identifier is an index; and wherein said response communication from said SMS server includes a range of said indexes associated with said one or more entities; and wherein a second request includes at least one index associated with one of said one or more items of information from said response communication.

23. The system of claim 21 wherein each said identifier is configured to be optionally included within or referenced by one or more requests that are later communicated from said user of said SMS enabled communications device to said SMS server within one SMS session.

24. The system of claim 21 where said SMS server provides information relating to telephone directory assistance; and wherein a first request communication from said user includes the name of an entity; and wherein an associated first SMS response communication from said SMS server includes telephone number and/or address information of one or more entities each having a name at least similar to said name of an entity.

25. The system of claim 21 wherein said SMS server provides information relating to telephone directory assistance;

wherein a first request communication from said user includes the name of an entity; and wherein an associated first SMS response communication from said SMS server includes telephone number and/or address information of one or more entities each having a name at least similar to said name of an entity; and wherein said telephone and/or said address information is at least partially hidden from said user; and wherein said user communicates a second request including said identifier to reveal said partially hidden information of at least one entity.

26. The system of claim 21 wherein said SMS server provides information relating to telephone directory assistance;

wherein a first request communication from said user includes the name of an entity; and wherein an associated first SMS response communication from said SMS server includes telephone number and/or address information of one or more entities each having a name at least similar to said name of an entity;

wherein said telephone and/or said address information is at least partially hidden from said user;

wherein said user communicates a second request including said identifier to reveal said partially hidden information of at least one entity; and wherein upon communication of said second request, said SMS server causes a billable event to be recorded and/or causes a chronological window of a particular length of time to be initiated; and wherein re-communication of said first and/or said second request within said chronological window does not cause another billable event to be recorded.

27. The system of claim 12 wherein said SMS server provides information relating to telephone directory assistance;

wherein a first request communication from said user includes a telephone number; and wherein an associated first SMS response communication from said SMS server includes a name and/or address information associated with an entity that is associated with said telephone number.

28. The system of claim 27 wherein said name and/or said address information is at least partially hidden from said user and where said user communicates a second request including said identifier to reveal said partially hidden information; and wherein upon communication of said second request, said SMS server causes a billable event to be recorded and/or causes a chronological window of a particular length of time to be initiated and where re-communication of said first and/or said second request within said chronological window does not cause another billable event to be recorded.

29. The system of claim 27 wherein upon communication of said first request from said user, said SMS server causes a billable event to be recorded and/or causes a chronological window of a particular length of time to be initiated; and wherein re-communication of said first and/or said second request within said chronological window does not cause another billable event to be recorded.

* * * * *

UNITED STATES PATENT AND TRADEMARK OFFICE
CERTIFICATE OF CORRECTION

PATENT NO. : 7,302,273 B2 Page 1 of 1
APPLICATION NO. : 11/177631
DATED : November 27, 2007
INVENTOR(S) : Aloke Chaudhuri It is certified that error appears in the above-identified patent and that said Letters Patent is hereby corrected as shown below:

On the title page, item [56]:

On Page 2, *References Cited*, please delete the U.S. PATENT DOCUMENT

"2004/0203834 A1 10/2004 Wang et al." and replace with

--2004/0203634 A1 10/2004 Wang et al.--

Column 19, Line 5, please delete the words "with-said entity" and replace with

--with said entity--

Signed and Sealed this

Eighth Day of April, 2008

JON W. DUDAS
*Director of the United States Patent and Trademark Office*